(12) United States Patent
Simons (10) Patent No.: US 9,992,660 B1
(45) Date of Patent: Jun. 5, 2018

(54) METHOD AND APPARATUS FOR INDUCTIVE COMMUNICATION

(71) Applicant: NXP B.V.

(72) Inventor: Sven Simons, Graz (AT)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/698,460

(22) Filed: Sep. 7, 2017

(30) Foreign Application Priority Data

Nov. 18, 2016 (EP) .................................... 16199554

(51) Int. Cl.
*H04W 4/80* (2018.01)
*G06K 19/07* (2006.01)
(Continued)

(52) U.S. Cl.
CPC .......... *H04W 4/80* (2018.02); *G06K 19/0709* (2013.01); *H04B 5/0081* (2013.01);
(Continued)

(58) Field of Classification Search
CPC ........... H01P 1/20372; H01L 2924/181; H01L 23/49855; G06K 19/0709; G06K 19/0712; G06K 19/0726; G06K 19/0723; H04W 4/008; H04W 4/80; H04B 5/0081; H04B 7/0814
(Continued)

(56) References Cited

U.S. PATENT DOCUMENTS 8,581,705 B2 * 11/2013 Stewart .............. G06K 19/0709
340/10.1
2008/0238624 A1 * 10/2008 Safarian ............... H04B 5/0012
340/10.1
(Continued)

FOREIGN PATENT DOCUMENTS

WO 2007/090114 A2 8/2007

OTHER PUBLICATIONS

NXP B.V. "HT-Pro 2 Family Transponder Operation Data sheet, Load-Dump/Reverse-Voltage Protection Circuits", 42 pgs. (May 25, 2011).
(Continued)

*Primary Examiner* — Ali Neyzari
(74) *Attorney, Agent, or Firm* — Rajeev Madnawat (57) ABSTRACT

A radio-frequency identification (RFID) transponder device is disclosed. The RFID transponder device includes an antenna component for inductive communication with at least one basestation transceiver device and an interface component coupled to the antenna component. The interface component includes a demodulation component arranged to perform demodulation of a signal at the antenna component for basestation-to-transponder communication and a modulation component arranged to perform modulation of the signal at the antenna component for transponder-to-basestation communication. The interface component is arranged to operate in at least a charge and talk mode of operation, and during the charge and talk mode of operation the modulation component is arranged to perform binary phase-shift keying, BPSK, modulation of the signal at the antenna component for the transponder-to-basestation communication. A RFID basestation transceiver device is also disclosed.

12 Claims, 5 Drawing Sheets

(51) Int. Cl.
*H04W 4/00* (2018.01)
*H04B 5/00* (2006.01)
*H04B 7/08* (2006.01)

(52) U.S. Cl.
CPC .......... *H04B 7/0814* (2013.01); *H04W 4/008* (2013.01); *G06K 19/0726* (2013.01)

(58) Field of Classification Search
USPC .............................. 340/10.1, 10.52; 455/41.1
See application file for complete search history.

(56) References Cited

U.S. PATENT DOCUMENTS

| | | |
|---|---|---|
| 2009/0009295 A1* | 1/2009 | Rofougaran ......... H04B 5/0012 340/10.1 |
| 2010/0052869 A1 | 3/2010 | Stewart |
| 2016/0197651 A1 | 7/2016 | Tsukamoto |

OTHER PUBLICATIONS

ISO "Radiofrequency identification of animals—Advanced transponders—Part 2: Code and command structure, International Standard, ISO 14223-2", 42 pgs. (2010).

* cited by examiner

METHOD AND APPARATUS FOR INDUCTIVE COMMUNICATION

CROSS-REFERENCE TO RELATED APPLICATIONS

This application claims the priority under 35 U.S.C. § 119 of European Patent application no. 16199554.3, filed on Nov. 18, 2016, the contents of which are incorporated by reference herein.

FIELD OF THE INVENTION

This invention relates to a method and apparatus for inductive communication, and in particular to a method and apparatus for performing inductive communication between an RFID basestation transceiver device and an RFID transponder device.

BACKGROUND OF THE INVENTION

Low frequency radio-frequency identification (RFID) devices, such as automotive immobilizer devices and the like, typically conform to ISO 11784, 11785 and 14223 standards defined by the International Organization for Standardization (ISO) for radio-frequency identification of animals. These standards define two protocols for communicating between a basestation transceiver device (also known as a 'reader') and a transponder device (also known as a 'tag').

The first of these protocols is a full-duplex communication protocol utilizing load-modulation with amplitude shift keying (ASK) for transponder-to-basestation communication. Basestation-to-transponder communication is achieved by the basestation transceiver device generating an AC magnetic field, and modulating the magnetic field in the amplitude domain to convey information to the transponder device. Transponder-to-basestation communication is achieved by the basestation transceiver device generating a constant AC magnetic field and the transponder device modulating the load it presents to its inductive antenna. Due to the inductive proximity coupling between the basestation transceiver device and the transponder device, modulating the load presented to the inductive antenna of the transponder effects the magnetic field. Load-modulation is robust against noise in the communication channel due to good signal amplitude and low system bandwidth requirements. However, the load-modulation effect on the magnetic field is small relative to the constant carrier generated by the basestation transceiver device, requiring a very high dynamic range for the basestation transceiver device in order to detect the load modulation of the transponder device, limiting the achievable communication distance.

The second protocol is a half-duplex (charge and talk) communication protocol utilizing frequency shift keying (FSK) for transponder-to-basestation communication when the magnetic field generated by the basestation transceiver device is turned off. Since the signal from the transponder is not required to be detected over the much larger signal generated by the basestation transceiver device, the dynamic range requirements for the receiver of the basestation transponder device are significantly lower than for a full-duplex implementation, enabling lower energy transmission by the transponder device. However, the bandwidth requirements for FSK modulation are higher than for ASK modulation, and the charge and talk FSK system is less robust against noise in the communication channel than for the load-modulation system.

SUMMARY OF THE INVENTION

The present invention provides an RFID transponder device, an RFID basestation transceiver device and a method of performing inductive communication between an RFID basestation transceiver device and an RFID transponder device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings in which there are illustrated example embodiments of a method and apparatus for performing inductive communication. However, it will be appreciated that the present invention is not limited to the specific examples herein described and as illustrated in the accompanying drawings.

Figure 1:
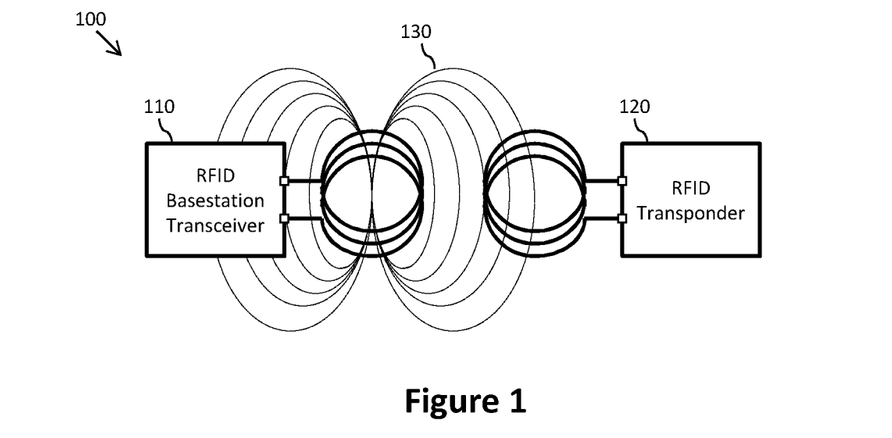
FIG. 1 schematically illustrates a simplified block diagram of an example of a radio-frequency identification (RFID) system 100.

Referring first to FIG. 1, there is illustrated a simplified block diagram of an example of a radio-frequency identification (RFID) system 100 comprising an RFID basestation transceiver device 110 and an RFID transponder device 120. In some example embodiments the RFID system 100 may comprise a low frequency (e.g. in the kilohertz range) RFID system. The basestation transceiver device 110 and transponder device 120 are arranged to perform inductive communication there between, and in particular are arranged to operate in at least a charge and talk mode of operation whereby the transponder device 120 is arranged to store energy from a magnetic field 130 generated by the basestation transceiver device 110 during charge phases and binary phase-shift keying (BPSK) modulation is used for transponder-to-basestation communication during talk phases.

Advantageously, by using BPSK modulation for chalk and talk transponder-to-basestation communication, a lower bandwidth requirement is achieved than with FSK modulation, leading to improved robustness in relation to channel noise (BPSK being antinodal verses orthogonal FSK) as compared with a conventional charge and talk system that uses FSK modulation, whilst maintaining the lower dynamic range receiver requirements for the basestation transceiver device 120 achieved through the use of chalk and talk operation (as compared with load-modulation). Furthermore, a higher possible signal amplitude is achievable in talk phase using BPSK modulation as compared with ASK (On Off Keying) modulation in a voltage limited device, such as a passive RFID transponder device.

Figure 2:
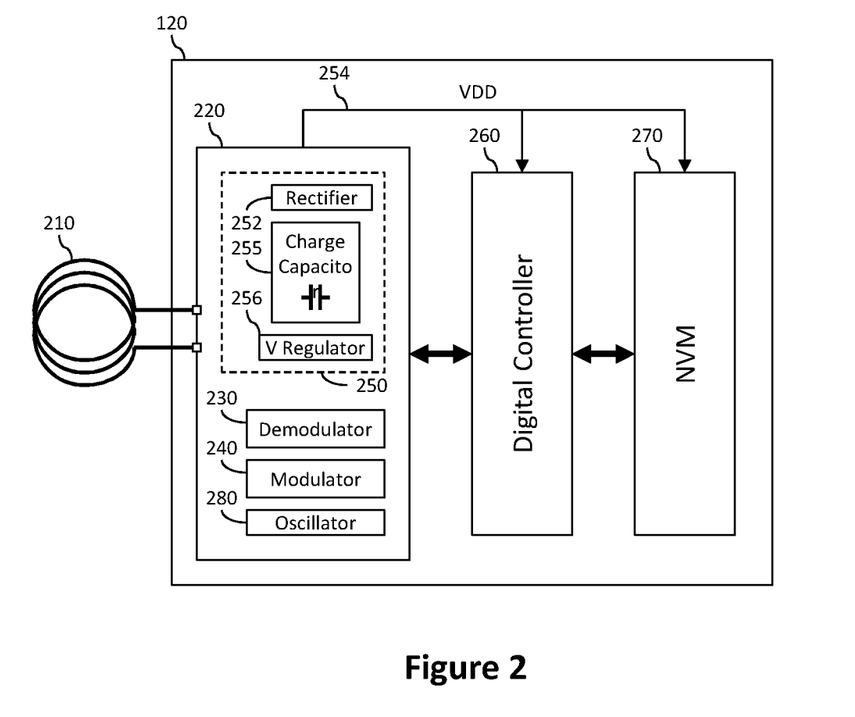
FIG. 2 illustrates a simplified block diagram of an example embodiment of a transponder device.

FIG. 2 illustrates a simplified block diagram of an example embodiment of the transponder device 120 illustrated in FIG. 1. The transponder device 120 comprises an antenna component 210 for inductive communication with a basestation transceiver device, such as the basestation transceiver device 110 illustrated in FIG. 1. The transponder device 210 further comprises an interface component 220 coupled to the antenna component 210. The interface component 220 comprises a demodulation component 230 arranged to perform demodulation of a signal at the antenna component 210 for basestation-to-transponder communication, and a modulation component 240 arranged to perform modulation of a signal at the antenna component 210 for transponder-to-basestation communication.

In the illustrated example, the transponder device 120 comprises a passive transponder device and the interface component 220 further comprises a power component 250 comprising an energy storage component 255, for example a charge capacitance, arranged store energy from a signal at the antenna component 210 supplied by an AC magnetic field generated by a basestation transceiver device, such as the basestation transceiver device 110 illustrated in FIG. 1. For example, the charge storage component 255 may be coupled to the antenna component 210 via a rectifier circuit 252. The energy stored within the charge storage component 250 may then be used to derive a supply voltage VDD 254 for the transponder device 120, for example via a voltage regulator circuit 256. In the illustrated example, the transponder device 120 further comprises a controller component 260, for example which may be implemented by way of a microcontroller. The transponder device 120 may further comprise a memory element 270 comprising non-volatile memory.

The interface component is arranged to operate in at least a charge and talk mode of operation, and during the charge and talk mode of operation the modulation component 240 is arranged to perform BPSK modulation of a signal provided to the antenna component 210 for transponder-to-basestation communication. For example, the modulation component 240 may be arranged to receive data to be communicated to the basestation transceiver device 110 from the controller component 260. The modulation component 240 may further be arranged to receive a carrier frequency signal, for example generated by an oscillator component 280, and to apply BPSK modulation to the carrier frequency signal to encode the received data to be communicated within the modulated carrier frequency signal. For example, the modulator component 240 may be arranged to modulate the carrier frequency signal between two phases depending on a bit value to be encoded. In some example embodiments, the modulator component 240 may be arranged to modulate the carrier frequency signal between two antinodal (180° separated) phases in optimize the robustness against noise of the modulated signal. The modulated carrier frequency signal may then be applied to the antenna component 210 to generate a corresponding magnetic field to be detected by the basestation transceiver device 110.

In accordance with some example embodiments, basestation-to-transponder communication may be modulated using ASK modulation, for example using binary pulse length modulation (BPLM) coding. Accordingly, the demodulation component 230 of the transponder device 120 may be arranged to perform ASK demodulation with BPLM decoding of signals received at the antenna component 210.

Figure 3:
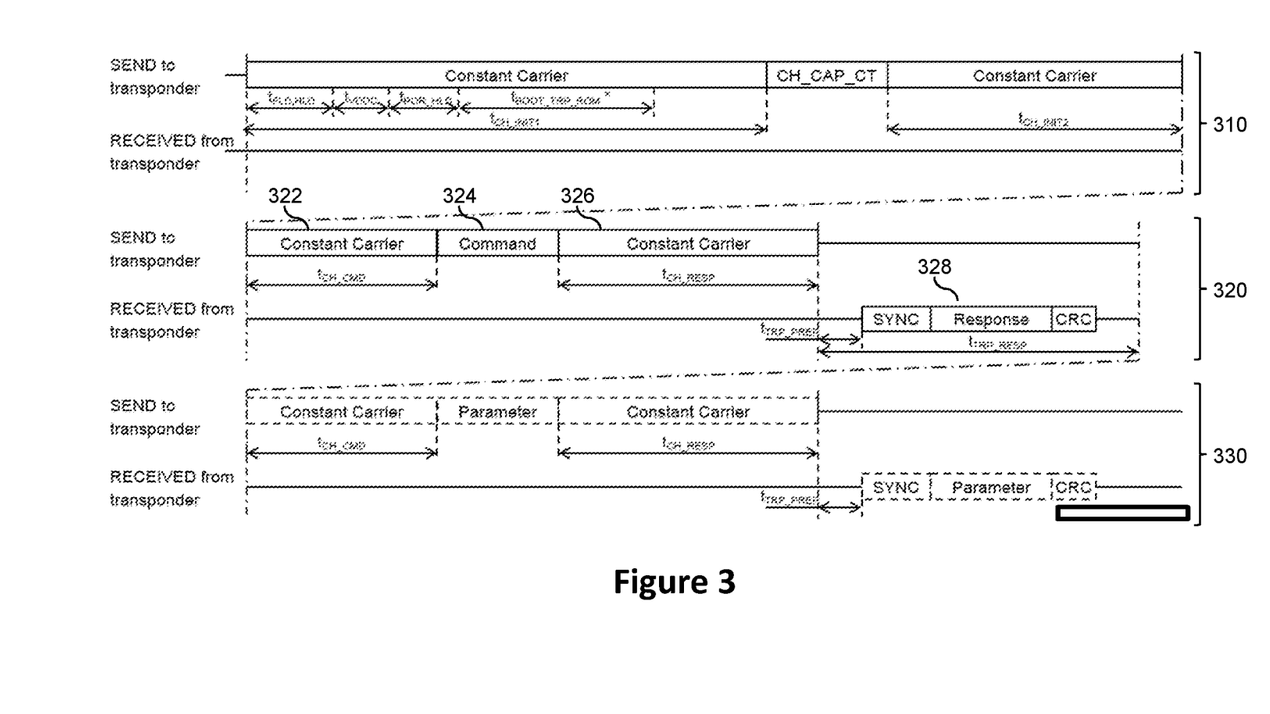
FIG. 3 illustrates a simplified charge and talk command sequence diagram between a basestation transceiver device and a transponder device.

FIG. 3 illustrates a simplified charge and talk command sequence diagram between a basestation transceiver device, such as the basestation transceiver device 110 of FIG. 1, and a transponder device, such as the transponder device 120 of FIGS. 1 and 2. After an initialisation sequence, illustrated at 310, one or more command-response cycles occur, such as illustrated at 320, 330. In a first command-response cycle 320 the basestation transceiver device 110 transmits a constant carrier signal for an initial constant carrier period 322 to enable the transponder device 120 to store energy for receiving a command. Following the initial constant command period 322 the basestation transceiver device 110 transmits the command, at 324.

Figure 4:
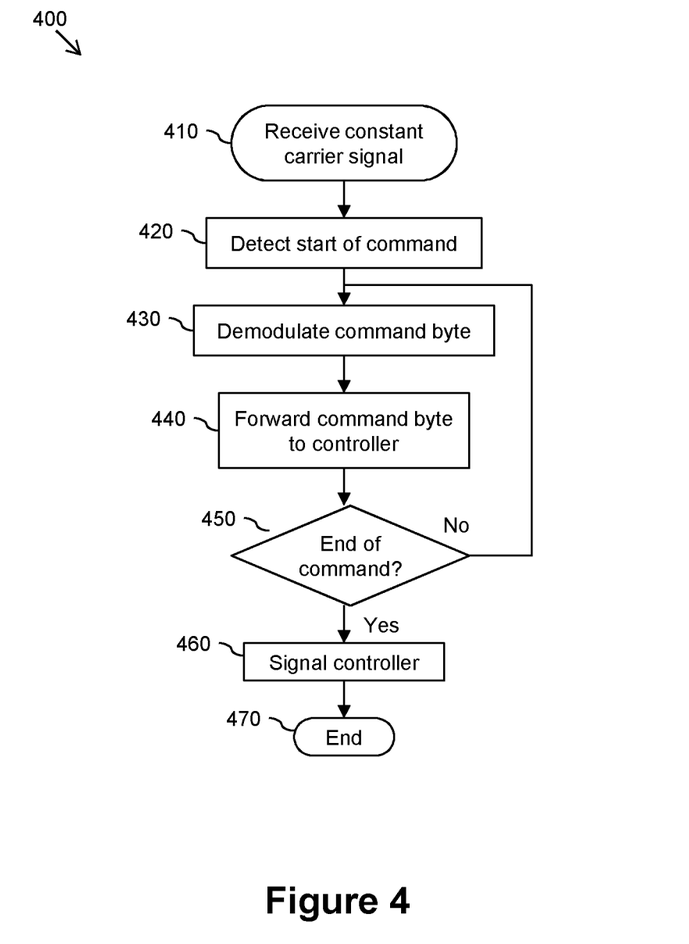
FIGS. 4 to 6 and 8 illustrate simplified flowcharts of an example of a method of performing inductive communication between an RFID basestation transceiver device and an RFID transponder device.

FIG. 4 illustrates a simplified flowchart 400 of an example of a part of a method of performing inductive communication between an RFID basestation transceiver device and an RFID transponder device, such as may be implemented within the basestation transceiver device 110 and RFID transponder device 120. In particular, FIG. 4 illustrates a part of the method in which the transponder device 120 receives a command from the basestation transceiver device 110. This part of the method starts at 410 with the responder receiving a constant carrier signal transmitted by the basestation transceiver device 110 at its antenna component 210. Energy from the received constant carrier signal is stored within the energy storage component 255 and used to charge and power the transponder device 120. A start of a command transmitted by the basestation transceiver component 110 is detected by the interface component 220 of the transponder device 120 at 420, and the method moves on to 430 where a first command byte of the received signal is demodulated by the demodulation component 230, for example using ASK demodulation (with BPLM decoding). The demodulated command byte is then forwarded to the controller 260 at 440. It is then determined whether the end of the command has been demodulated, for example based on a predefined number of command bytes, a too long bit (stop bit longer than a single 0 or 1 bit), etc. If it is determined that the last byte for the command has not been demodulated, the method loops back to 430 where the next command byte is demodulated. Conversely, if it is determined that the last command byte has been demodulated, the method moves on to 460 where the controller 260 is signalled that all command bytes have been demodulated, and this part of the method ends at 470.

Referring back to FIG. 3, having transmitted the command, the basestation transceiver device 110 transmits a constant carrier signal for a further constant carrier period 326 to enable the transponder device 120 to continue to store energy whilst processing the received command and preparing a response.

In accordance with some example embodiments, upon receipt of a command from the basestation transceiver 110 requiring a response, the interface component 220 of the transponder device 120 may be arranged to determine a strongest transmission channel for the received command, and to cause a response to be transmitted back to the basestation transceiver 110 over a response channel corresponding to the determined strongest transmission channel for the received command. For example, it is contemplated that the basestation transceiver device 110 and/or the transponder device 120 may comprise multiple antennae (e.g. forming a '3-d' antenna arrangement). In this manner, an optimum channel for responding to the received command can be identified, and the response need only be transmitted over the identified optimum channel to the basestation transceiver device 110 to save energy.

Figure 5:
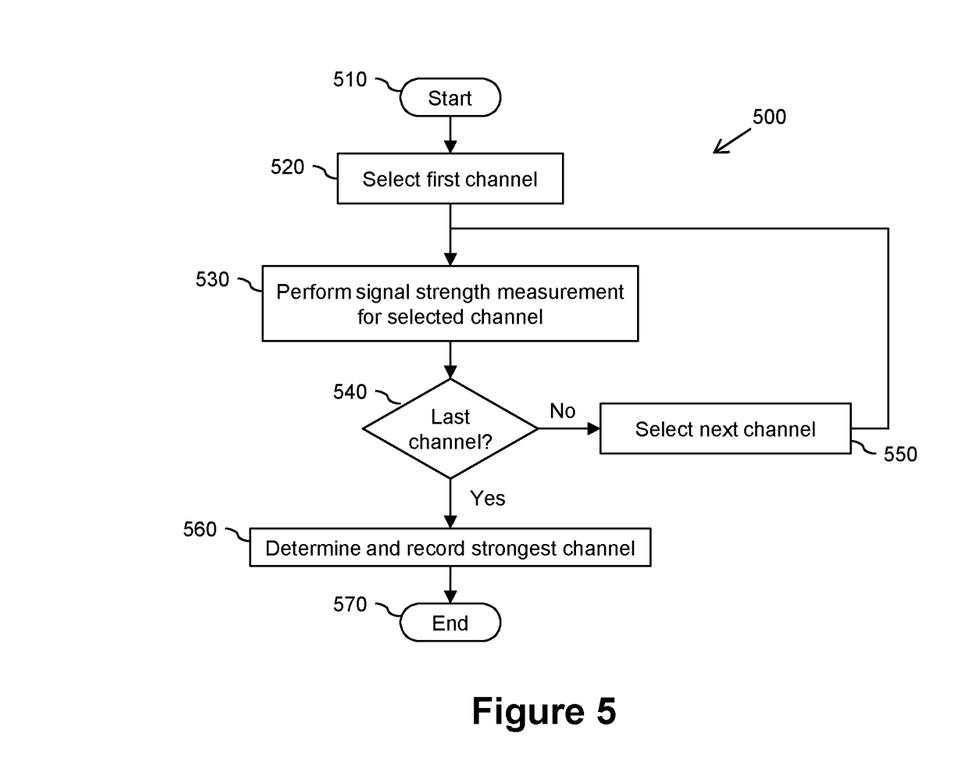

FIG. 5 illustrates a simplified flowchart 500 of an example of a further part of the method of performing inductive communication between an RFID basestation transceiver device and an RFID transponder device in which the transponder device 120 is arranged to determine a strongest transmission channel for a received command. This part of the method starts at 510, and moves on to 520 where a first received channel is selected. A signal strength measurement for the selected channel is then performed at 530. It is then determined whether signal strength measurements have been performed for all received channels, at 540. If it is determined that signal strength measurements have not been performed for all channels, the method moves on to 550 where a next channel is selected before looping back to 530. Conversely, if it is determined that signal strength measurements have been performed for all channels, the method moves on to 560 where it is determined for which channel a strongest signal strength measurement has been obtained, and said channel is recorded. This part of the method the ends at 570. It is contemplated that in alternative embodiments the strongest coupled channel assessment may alternatively comprise checking all channels in parallel. For example, the loads presented to the individual channel antennae of the transponder device 120 may be increased in a loop until the strongest coupled channel is found.

In accordance with some further example embodiments, the interface component 220 may further be arranged to perform calibration of the oscillator component 280 based upon the received constant carrier signal received from the basestation transceiver device 110 to improve the accuracy of the response carrier signal generated by the oscillator component 280.

Referring back to FIG. 3, having transmitted a constant carrier signal for a further constant carrier period 326, the basestation transceiver device 110 then ceases transmitting its carrier signal, ending the 'charge' phase and beginning the 'talk' phase in which the transponder device 120 is able to transmit a response 328 back to the basestation transceiver device 110. In the illustrated example the response transmitted by the transponder device comprises an initial synchronisation pattern followed by the response payload, and finally a cyclic redundancy check value.

Figure 6:
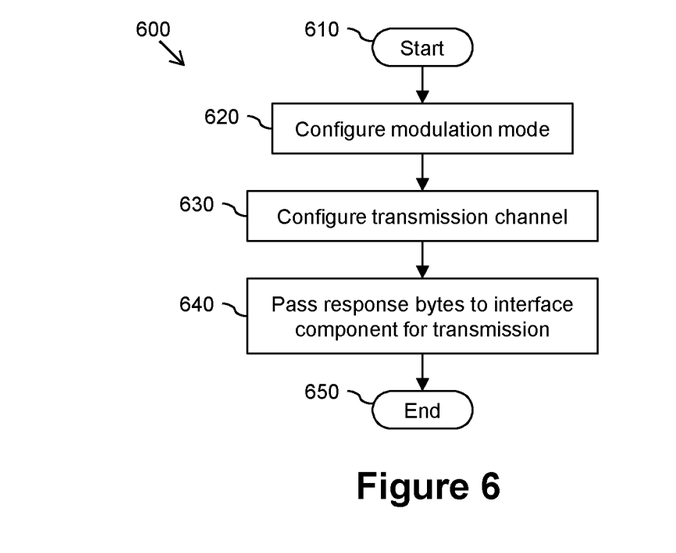

FIG. 6 illustrates a simplified flowchart 600 of an example of a further part of the method of performing inductive communication between an RFID basestation transceiver device and an RFID transponder device in which the transponder device 120 is arranged to modulate a signal at the antenna component 210 thereof for transmitting the response 328 back to the basestation transceiver device 110. This part of the method starts at 610 and moves on to 620 where in the illustrated example a modulation mode is configured.

For example, it is contemplated that the transponder device 120 may be capable of operating in multiple modes, for example a charge and talk mode or load-modulation mode, and the operating mode may be controlled by the basestation transceiver device 110, for example by way of the command received therefrom, and each operating mode may require a different form of modulation to be performed by the modulation component 240 for transponder-to-basestation communication. Accordingly, upon receipt of a command from the basestation transceiver device 120, the controller 260 of the transponder device 120 may be arranged to determine from the command payload what operating mode the transponder is to operate in. Having determined the operating mode in which the transponder device 120 is to operate in when responding to the received command, the controller 260 may then configure the interface component 220 to operate in the determined mode (e.g. either charge and talk or load-modulation). The interface component 220 may then configure the modulation component 240 to perform the appropriate form of modulation (e.g. BPSK modulation for charge and talk operation or modulation of the load presented to the antenna component 210 for load-modulation).

Having configured the required modulation mode, for example as indicated by the controller 260, the method moves on to 630 where in the illustrated example a transmission channel to be used for responding to the received command is configured. For example, as described above in some example embodiments a strongest transmission channel for the received command may be determined in order to identify an optimum channel for responding to the received command. Accordingly, the oscillator 280 may be configured to generate a carrier frequency signal having a frequency corresponding to the determined optimum channel or responding to the received command.

Having configured the transmission channel (e.g. the oscillator 280 to generate the required carrier frequency signal), the method moves on to 640 where response data to be transmitted to the basestation transceiver device 110 are passed to the interface component 220 for transmission, whereby the response data, for example whereby the modulation component 240 performs BPSK modulation of the carrier frequency signal generated by the oscillator 280 to encode the response data for transmission. This part of the method then ends, at 650.

Thus, in accordance with some example embodiments, upon receipt of a command from the basestation transceiver device 110, the interface component 220 of the transponder device 120 may be arranged to determine a strongest transmission channel for the received command, configure the oscillator 280 to generate a response channel frequency signal corresponding to the determined strongest transmission channel for the received command, cause the modulation component 240 to perform modulation of the response channel frequency signal in accordance with the response to the received command from the basestation transceiver device 110, and apply the modulated response channel frequency signal to the antenna component 210.

Figure 7:
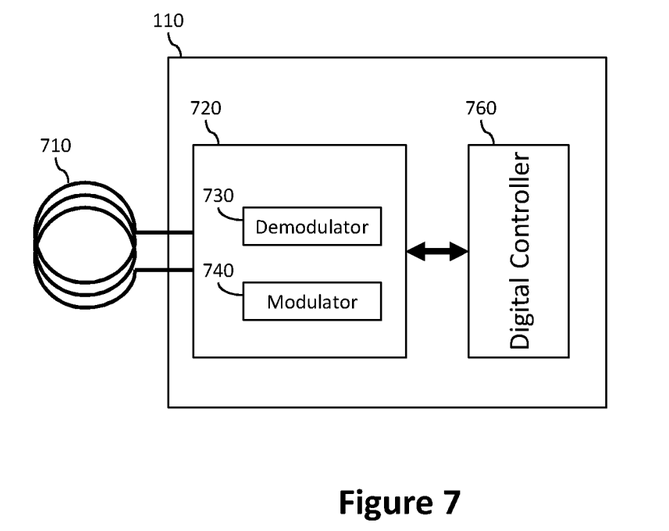
FIG. 7 illustrates a simplified block diagram of an example embodiment of a basestation transceiver device.

Referring now to FIG. 7, there is illustrated a simplified block diagram of an example embodiment of the basestation transceiver device 110 illustrated in FIG. 1. The basestation transceiver device 110 comprises an antenna component 710 for inductive communication with a transponder device, such as the transponder device 120 illustrated in FIGS. 1 and 2. The basestation transceiver device 110 further comprises an interface component 720 coupled to the antenna component 710. The interface component 720 comprises a demodulation component 730 arranged to perform demodulation of a signal at the antenna component 710 for transponder-to-basestation communication, and a modulation component 740 arranged to perform modulation of a signal at the antenna component 710 for basestation-to-transponder communication.

In accordance with example embodiments, the interface component 730 of the basestation transceiver device 110 is arranged to operate in at least a charge and talk mode of operation, and during the charge and talk mode of operation the demodulation component 730 is arranged to perform BPSK demodulation of the signal at the antenna component 710 for transponder-to-basestation communication. In some embodiments, the modulation component 740 may be arranged to perform ASK modulation with BPLM encoding of signals to be transmitted via the antenna component 710 for basestation-to-transponder communication.

Figure 8:
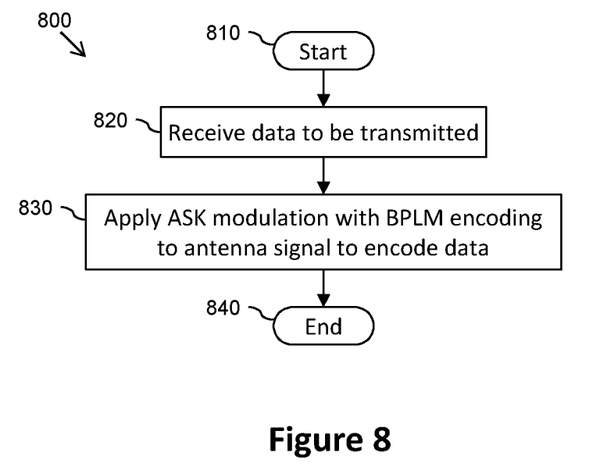

FIG. 8 illustrates a simplified flowchart 800 of an example of a further part of the method of performing inductive communication between an RFID basestation transceiver device and an RFID transponder device in which the basestation transceiver device 110 is arranged to modulate a signal at the antenna component 710 thereof for transmitting a command to the transponder device 120. This part of the method starts at 810 and moves on to 820 where in the illustrated example the interface component of the basestation transceiver device 110 is arranged to receive data to be transmitted to the transponder device 120, for example from a controller component 760 (FIG. 7). ASK modulation with BPLM encoding is then applied to a signal at the antenna component 710 of the basestation transceiver device 110 in accordance with the received data for basestation-to-transponder communication, at 830, and the method ends as 840.

It is contemplated that at least parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention. For example, it would be readily apparent to a person skilled in the art how to implement a modulation component for performing BPSK modulation, load-modulation, etc. Accordingly, specific implementations of such modulation components have not been explained in detail herein. Furthermore, it will be appreciated that such a modulation component may be implemented using analogue circuitry, digital circuity or a combination of the two.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A radio-frequency identification (RFID) transponder device comprising:
    an antenna component for inductive communication with at least one basestation transceiver device, and
    an interface component coupled to the antenna component, the interface component comprising:
        a demodulation component arranged to perform demodulation of a signal at the antenna component for basestation-to-transponder communication, and
        a modulation component arranged to perform modulation of the signal at the antenna component for transponder-to-basestation communication;
        wherein the interface component is arranged to operate in at least a charge and talk mode of operation, and during the charge and talk mode of operation the modulation component is arranged to perform binary phase-shift keying, BPSK, modulation of the signal at the antenna component for the transponder-to-basestation communication.

2. The RFID transponder device of claim 1, wherein upon receipt of a command from a basestation transceiver requiring a response, the interface component is arranged to determine a strongest transmission channel for the received command and cause the response to be transmitted back to the basestation transceiver over a response channel corresponding to the determined strongest transmission channel for the received command.

3. The RFID transponder device of claim 2, wherein upon receipt of the command from the basestation transceiver requiring a response, the interface component is arranged to:
    determine a strongest transmission channel for the received command;
    configure an oscillator to generate a response channel frequency signal corresponding to the determined strongest transmission channel for the received command;
    cause the modulation component to perform modulation of the response channel frequency signal in accordance with the response to the received command from the basestation transceiver; and
    apply the modulated response channel frequency signal to the antenna component.

4. The RFID transponder device of claim 1, wherein:
    the RFID transponder device further comprises a controller component; and
    the interface component is configurable to operate in one of the charge and talk mode of operation and a load-modulation mode of operation, and upon receipt of a command from a basestation transceiver requiring a response, the controller component is arranged to configure the interface component to operate in one of the charge and talk mode of operation and the load-modulation mode of operation based at least partly on the received command.

5. The RFID transponder device of claim 1, wherein the RFID transponder device comprises a low frequency RFID transponder device.

6. The RFID transponder device of claim 1, wherein the RFID transponder device is a passive RFID transponder device comprising at least one energy storage component arranged to store energy from the signal at the antenna component.

7. A radio-frequency identification (RFID) basestation transceiver device comprising:

an antenna component for inductive communication with at least one transponder device, and an interface component coupled to the antenna component, the interface component comprising:

a demodulation component arranged to perform demodulation of a signal at the antenna component for transponder-to-basestation communication, and a modulation component arranged to perform modulation of the signal at the antenna component for basestation-to-transponder communication;

wherein the interface component is arranged to operate in at least a charge and talk mode of operation, and during the charge and talk mode of operation the demodulation component is arranged to perform binary phase-shift keying, BPSK, demodulation of the signal at the antenna component for the transponder-to-basestation communication.

8. The RFID basestation transceiver device of claim 7, wherein the RFID basestation transceiver device comprises a lower frequency RFID basestation transceiver device.

9. The RFID basestation transceiver device of claim 7, arranged to communicate with at least one passive transponder device.

10. A method of performing inductive communication between a radio-frequency identification, RFID, basestation transceiver device and an RFID transponder device; wherein the method comprises, at the RFID transponder device, performing binary phase-shift keying, BPSK, modulation of a signal at an antenna component of the RFID transponder device for transponder-to-basestation communication.

11. The method of claim 10, wherein the method further comprises, upon receipt of a command at the RFID transponder device requiring a response:

determining a strongest transmission channel for the received command; and causing the response to be transmitted back to the basestation transceiver over a response channel corresponding to the determined strongest transmission channel for the received command.

12. A method of performing inductive communication between a radio-frequency identification, RFID, basestation transceiver device and an RFID transponder device; wherein the method comprises, at the RFID basestation transceiver device, receiving data to be communicated to the RFID transponder device, and performing binary phase-shift keying, BPSK, modulation of a signal at an antenna component of the RFID basestation transceiver device in accordance with the received data for transponder-to-basestation communication.

* * * * *